US011286060B2

(12) United States Patent
Mansour et al.

(10) Patent No.: US 11,286,060 B2
(45) Date of Patent: Mar. 29, 2022

(54) AUTONOMOUS CONTROL OF ELECTRIC POWER SUPPLIED TO A THRUSTER DURING ELECTRIC ORBIT RAISING

(71) Applicant: The Boeing Company, Chicago, IL (US)

(72) Inventors: Sadek W. Mansour, Torrance, CA (US); Jeffrey Scott Noel, Torrance, CA (US); Rainier Pio Roda, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 583 days.

(21) Appl. No.: 16/227,719

(22) Filed: Dec. 20, 2018

(65) Prior Publication Data

US 2020/0198807 A1 Jun. 25, 2020

(51) Int. Cl.

*B64G 1/00* (2006.01)
*B64G 1/24* (2006.01)
*G05D 1/06* (2006.01)
*B64G 1/26* (2006.01)

(Continued)

(52) U.S. Cl.

CPC .............. *B64G 1/007* (2013.01); *B60L 58/14* (2019.02); *B64G 1/242* (2013.01); *B64G 1/26* (2013.01); *B64G 1/405* (2013.01); *G05D 1/06* (2013.01)

(58) Field of Classification Search

CPC .......... B64G 1/007; B64G 1/242; B64G 1/26; B64G 1/405; B64G 1/44; B64G 1/425; G05D 1/06; B60L 58/14; Y02T 10/70

See application file for complete search history.

(56) References Cited

U.S. PATENT DOCUMENTS 4,995,216 A * 2/1991 Vansteelant ......... A01F 15/0715 53/118
5,551,218 A * 9/1996 Henderson .............. A01F 15/07 100/13

(Continued)

FOREIGN PATENT DOCUMENTS

AU 2015222926 A1 * 10/2016 ............. G01S 19/43
CA 2940652 A1 * 9/2015 ........... G01S 19/425

(Continued)

OTHER PUBLICATIONS

Extended European Search Report dated May 4, 2020 for European Patent Application No. 19202923.9, 10 pages.

(Continued)

*Primary Examiner* — Behrang Badii
*Assistant Examiner* — Jalal C Coduroglu
(74) *Attorney, Agent, or Firm* — Sage Patent Group

(57) ABSTRACT

A method for autonomously controlling electric power supplied to a thruster of a spacecraft during electric orbit raising includes determining a state of charge of a battery onboard the spacecraft at an entry into an eclipse during each orbit of a plurality of orbits during the electric orbit raising of the spacecraft. The method also includes determining an electric power level used to fire each thruster of a plurality of thrusters during each orbit beginning after the eclipse, based at least on the state of charge of the battery, and that will provide a shortest electric orbit raising duration and minimize thruster propellant usage during electric orbit raising.

20 Claims, 7 Drawing Sheets

300
308
304
306
302

SEPARATION ORBIT
INTERMEDIATE ORBITS
TARGET / OPS ORBIT
SUN POSITION

(51) Int. Cl.
*B60L 58/14* (2019.01)
*B64G 1/40* (2006.01)

(56) References Cited

U.S. PATENT DOCUMENTS 5,557,510 A * 9/1996 McIntyre ................ A01F 15/07 172/75
5,595,360 A * 1/1997 Spitzer ................... B64G 1/007 244/158.5
5,685,505 A * 11/1997 Meckler .................. H02J 50/30 244/169
5,716,029 A 2/1998 Spitzer et al.
5,847,520 A * 12/1998 Theurillat ............... B60L 50/61 318/139
6,031,334 A * 2/2000 Meyer ................... F03H 1/0018 313/359.1
6,081,710 A * 6/2000 Sherman ........... H04B 7/18543 370/316
6,116,543 A 9/2000 Koppel
6,181,115 B1 * 1/2001 Perol ..................... H01M 10/44 323/234
6,237,876 B1 5/2001 Barker
6,341,749 B1 * 1/2002 Ocampo ................ B64G 1/007 244/158.5
6,449,936 B1 * 9/2002 Anstey ................. A01D 89/004 56/341
6,543,723 B1 4/2003 Oh
6,845,950 B1 1/2005 Goodzeit et al.
6,942,186 B1 * 9/2005 Levin ..................... B64G 1/648 244/158.2
7,113,851 B1 9/2006 Gelon et al.
7,197,979 B2 * 4/2007 Derscheid ........... A01F 15/0833 100/87
7,246,775 B1 7/2007 Goodzeit et al.
7,640,852 B1 * 1/2010 Anstey ................ A01F 15/0833 100/88
7,694,504 B1 * 4/2010 Viaud .................... A01D 90/04 56/341
8,056,314 B1 * 11/2011 Anstey .................. A01F 15/106 56/364
8,152,108 B2 * 4/2012 Becker-Irvin .......... B64G 1/425 244/172.7
8,457,810 B1 * 6/2013 Batla ........................ B64G 1/26 701/13
8,763,957 B1 * 7/2014 Higham ................... B64G 1/26 244/158.6
8,930,048 B1 * 1/2015 Batla ...................... B64G 1/242 701/13
9,108,748 B2 8/2015 Munir et al.
2003/0062452 A1 * 4/2003 Oh ......................... B64G 1/007 244/158.5
2004/0083704 A1 * 5/2004 Lucand ................. A01F 15/106 56/341
2004/0090195 A1 * 5/2004 Motsenbocker ........ B60L 58/33 318/109
2006/0048481 A1 * 3/2006 Hood .................. A01F 15/0715 53/399
2009/0310391 A1 * 12/2009 Becker-Irvin ..... H01L 31/02021 363/79
2011/0073714 A1 * 3/2011 Hruby .................... B64G 1/428 244/171.1
2012/0097796 A1 4/2012 Munir et al.
2012/0217348 A1 * 8/2012 Aguirre Martinez ........................ B64G 1/1021 244/158.5
2014/0109164 A1 * 4/2014 Yamagishi ......... H04N 21/4436 725/131
2015/0134175 A1 * 5/2015 Derscheid ............ G05D 1/0278 701/23
2015/0156842 A1 * 6/2015 Miyahara ............... H05B 47/16 315/210
2016/0011318 A1 * 1/2016 Cohen ................... G01S 19/425 342/357.26
2016/0050851 A1 * 2/2016 Kraus ................. A01F 15/0883 56/341
2016/0165803 A1 * 6/2016 Smith .................... G05B 15/02 700/275
2016/0251092 A1 * 9/2016 Cappaert ................ B64G 1/428 307/9.1
2016/0290223 A1 * 10/2016 Mills ....................... F02B 51/04
2016/0355292 A1 * 12/2016 Wigdahl ............. A01F 15/0715
2016/0368624 A1 * 12/2016 Hruby .................... B64G 1/007
2017/0049058 A1 * 2/2017 Eubanks ............. A01F 15/0715
2017/0287303 A1 * 10/2017 Lang ....................... A01F 15/08
2017/0332556 A1 * 11/2017 Underhill ............ A01F 15/0883
2020/0198808 A1 6/2020 Noel et al.
2020/0198810 A1 6/2020 Noel et al.
2020/0198811 A1 6/2020 Hahn, III et al.

FOREIGN PATENT DOCUMENTS

EP 1059232 A2 12/2000
EP 3110695 A2 * 1/2017 ............. G01S 19/42
EP 3110695 A4 * 2/2018 ............. G01S 19/43
EP 3670360 A1 * 6/2020 ............. B64G 1/405
EP 3672018 A1 * 6/2020 ............... B64G 1/44
FR 2785103 A1 * 4/2000 .......... H01M 10/465
GB 2413861 A 11/2005
KR 20150031329 A * 3/2015 .............. B60L 53/14
KR 20160147724 A * 12/2016 ............. G01S 19/43
RU 2459749 C1 * 8/2012 ............. B64G 1/428
RU 2496690 C1 * 10/2013
RU 2541512 C2 * 2/2015 .......... B60L 11/1861
RU 2585171 C1 * 5/2016
RU 2586172 C2 * 6/2016
RU 2611568 C1 * 2/2017
RU 2621694 C2 * 6/2017
RU 2661187 C1 * 7/2018
WO WO-2009155158 A1 * 12/2009 ............. B64G 1/428
WO WO-2014021363 A1 * 2/2014 .......... B60L 11/1861
WO WO-2015130950 A2 * 9/2015 ........... G01S 19/425
WO WO-2015130950 A3 * 11/2015 ............. G01S 19/45

OTHER PUBLICATIONS

Extended European Search Report dated May 18, 2020 for European Patent Application No. 19210308.3, 9 pages.

Extended European Search Report dated May 18, 2020 for European Patent Application No. 19217666.7, 6 pages.

Chetty, P.R.K. et al. “Topex Electrical Power System,” Aerospace Power Systems, Proceedings of the Intersociety Energy Conversion Engineering Conference, IEEE, Boston, Aug. 4-9, 1991, pp. 36-44.

Shaff, Sven et al., “Advanced Electric Orbit-Raising Optimization for Operational Purpose” (2015), Astos Solutions GmbH, retrieved from the Internet at: https://www.astos.de/resources?query_string=downloads, 13 pages.

Kimbrel, Michael S. “Optimization of Electric Propulsion Orbit Raising” (Jun. 2002), Massachusetts Institute of Technology, Department of Aeronautics and Astronautics, retrieved from the Internet at: https://dspace.mit.edu/handle/1721.1/82240, 102 pages.

* cited by examiner

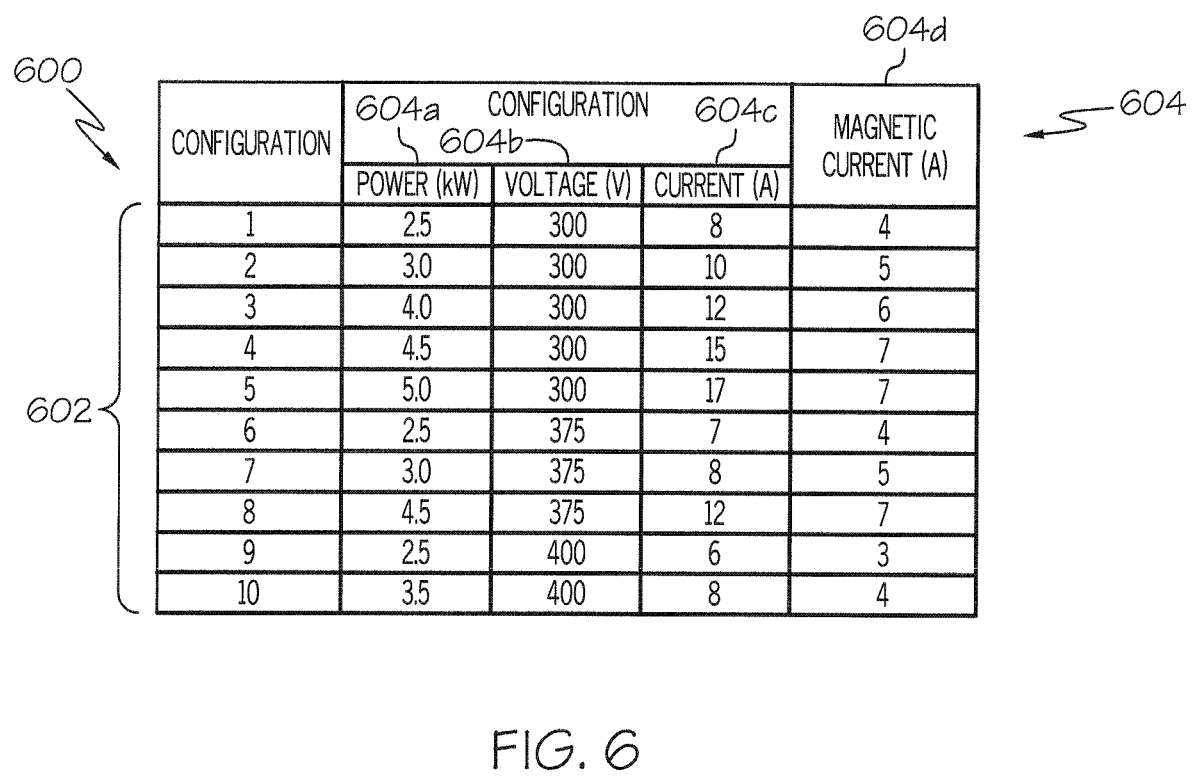

| CONFIGURATION | CONFIGURATION | | | MAGNETIC CURRENT (A) |
|---|---|---|---|---|
| | POWER (kW) | VOLTAGE (V) | CURRENT (A) | |
| 1 | 2.5 | 300 | 8 | 4 |
| 2 | 3.0 | 300 | 10 | 5 |
| 3 | 4.0 | 300 | 12 | 6 |
| 4 | 4.5 | 300 | 15 | 7 |
| 5 | 5.0 | 300 | 17 | 7 |
| 6 | 2.5 | 375 | 7 | 4 |
| 7 | 3.0 | 375 | 8 | 5 |
| 8 | 4.5 | 375 | 12 | 7 |
| 9 | 2.5 | 400 | 6 | 3 |
| 10 | 3.5 | 400 | 8 | 4 |

FIG. 6

AUTONOMOUS CONTROL OF ELECTRIC POWER SUPPLIED TO A THRUSTER DURING ELECTRIC ORBIT RAISING

CROSS-REFERENCE TO RELATED APPLICATIONS

The application is related to U.S. patent application Ser. No. 16/227,659, entitled "Optimized Power Balanced Variable Thrust Transfer Orbits to Minimize an Electric Orbit Raising Duration," filed the same date and assigned to the same assignee as the present application and is incorporated herein by reference.

The application is related to U.S. patent application Ser. No. 16/228,000; entitled "Autonomous Control of Electric Power Consumption by an Apparatus," filed the same date and assigned to the same assignee as the present application and is incorporated herein by reference.

FIELD

The present disclosure relates to spacecraft, satellites and the like and more particularly to autonomous control of electric power supplied to a thruster of a spacecraft during electric orbit raising.

BACKGROUND

Electric orbit raising involves moving a spacecraft, such as a satellite, from an initial injection orbit after separation from a launch vehicle to a final orbit or target orbit where the spacecraft will operate during its useful life. Thrusters are used during electric orbit raising to move the spacecraft from the initial injection orbit to the target orbit. The thrusters use a propellant. The amount of thrust generated by each thruster during firing is controlled by an amount of electric power supplied to the thruster and the amount of propellant used during operation of the thruster is determined by the amount of electric power supplied. The amount of electric power and propellant used will also be dependent upon the duration of firing of the thruster each time the thruster is fired. The thrusters are also used for station keeping once the spacecraft is in the target orbit. Accordingly, minimizing the duration of electric orbit raising and controlling electric power to the thrusters during electric orbit raising is important to preserve as much propellant as possible for station keeping.

SUMMARY

In accordance with an embodiment, a method for autonomously controlling electric power supplied to a thruster of a spacecraft during electric orbit raising includes determining, by a processor, a state of charge of a battery onboard the spacecraft at an entry into an eclipse during each orbit of a plurality of orbits during the electric orbit raising of the spacecraft. The method also includes determining, by the processor, an electric power level used to fire each thruster of a plurality of thrusters during each orbit beginning after the eclipse, based at least on the state of charge of the battery, and that will provide a shortest electric orbit raising duration and minimize thruster propellant usage during electric orbit raising.

In accordance with an embodiment, a system for autonomously controlling electric power supplied to a thruster of a spacecraft during electric orbit raising includes a battery to power the spacecraft and a plurality of thrusters used for electric orbit raising of the spacecraft and station keeping of the spacecraft. The system also includes spacecraft control electronics powered by the battery. The spacecraft control electronics are configured to control operation of the thrusters. The spacecraft control electronics are further configured to determine a state of charge of the battery onboard the spacecraft at an entry into an eclipse during each orbit of a plurality of orbits during the electric orbit raising of the spacecraft. The spacecraft control electronics are also configured to determine an electric power level used to fire each thruster of the plurality of thrusters during each orbit beginning after the eclipse, based on the state of charge of the battery, and that will provide a shortest electric orbit raising duration and minimize thruster propellant usage during the electric orbit raising.

In accordance with an embodiment and any of the previous embodiments, the spacecraft control electronics are further configured to balance the state of charge of the battery for each orbit by autonomously controlling the electric power level and timing during which each thruster is fired during each orbit of the electric orbit raising.

In accordance with an embodiment and any of the previous embodiments, the spacecraft control electronics are further configured to fire each thruster during sun light and to shut off each thruster during the eclipse of each orbit of the plurality of orbits during electric orbit raising.

In accordance with an embodiment and any of the previous embodiments, the electric power level used to fire each thruster is determined by determining an electric power level supplied to each thruster by a power processing unit associated with each thruster. The electric power level supplied by the power processing unit to the associated thruster is set based on matching a particular state of charge of the battery to a corresponding one of a plurality of predefined operating points of the associated thruster.

In accordance with an embodiment and any of the previous embodiments, the electric power level supplied by the power processing unit to the associated thruster is set in steps to match the particular state of charge of the battery to the corresponding one of the plurality of predefined operating points of the associated thruster.

In accordance with an embodiment and any of the previous embodiments, the method and system further include balancing the state of charge of the battery for each orbit by autonomously controlling the electric power level and timing during which each thruster is fired during each orbit of the electric orbit raising.

In accordance with an embodiment and any of the previous embodiments, the method and system further include firing each thruster during sun light and shutting off each thruster during the eclipse of each orbit of the plurality of orbits during electric orbit raising.

In accordance with an embodiment and any of the previous embodiments, the electric power level used to fire each thruster is autonomously controlled onboard the spacecraft without control from a ground station or with minimal control from the ground station.

In accordance with an embodiment and any of the previous embodiments, wherein determining the electric power level used to fire each thruster includes determining an electric power level supplied to each thruster by a power processing unit associated with each thruster.

In accordance with an embodiment and any of the previous embodiments, wherein the electric power level supplied by the power processing unit to the associated thruster is set based on matching a particular state of charge of the battery to a corresponding one of a plurality of predefined operating points of the associated thruster.

In accordance with an embodiment and any of the previous embodiments, wherein the electric power level supplied by the power processing unit to the associated thruster is set in steps to match the particular state of charge of the battery to the corresponding one of the plurality of predefined operating points of the associated thruster.

In accordance with an embodiment and any of the previous embodiments, wherein the method and system further include setting the electric power level supplied by the power processing unit by adding a chosen number of power level steps to a base power level in response to the state of charge of the battery exceeding or being equal to a preset threshold. The chosen number of power level steps is determined by matching the state of charge of the battery to a corresponding predefined operating point of the plurality of predefined operating points of the associated thruster.

In accordance with an embodiment and any of the previous embodiments, wherein the method and system further include setting the electric power level supplied by the power processing unit by subtracting a chosen number of power level steps from a base power level in response to the state of charge of the battery being less than a preset threshold. The chosen number of power level steps is determined by matching the state of charge of the battery to a corresponding predefined operating point of the plurality of predefined operating points of the associated thruster.

In accordance with an embodiment and any of the previous embodiments, wherein the method and system further include switching between a plurality of predefined operating points of the power processing unit associated with each thruster to maintain a balanced state of charge of the battery. The plurality of predefined operating points includes a set of parameters of the associated thruster.

In accordance with an embodiment and any of the previous embodiments, wherein each of the plurality of predefined operating points of the power processing unit are defined by a group of parameters including a discharge current, a discharge voltage and a magnetic current of the power processing unit.

In accordance with an embodiment and any of the previous embodiments, wherein the method and system further include minimizing thruster propellant usage and minimizing electric orbit raising duration by switching between the predefined operating points of the power processing unit to maintain the balanced state of charge of the battery.

In accordance with an embodiment and any of the previous embodiments, wherein the method and system further include performing fault protection in response to being unable to maintain a balanced state of charge of the battery.

In accordance with an embodiment and any of the previous embodiments, wherein performing the fault protection includes performing a level 1 fault protection in response to the state of charge of the battery being below a first preset fault threshold. The level 1 fault protection including shutting down the power processing unit associated with each thruster.

In accordance with an embodiment and any of the previous embodiments, wherein performing the fault protection includes performing a level 2 fault protection in response to the state of charge of the battery being below a second preset fault threshold lower than the first preset fault threshold. The level 2 fault protection includes switching an integrated power controller (IPC) off in addition to shutting down the power processing unit associated with each thruster.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIG. 6 is a table of an example of operating points of a power processing unit to supply power to an associated thruster in accordance with an embodiment of the present disclosure.

DETAILED DESCRIPTION

Figure 1:
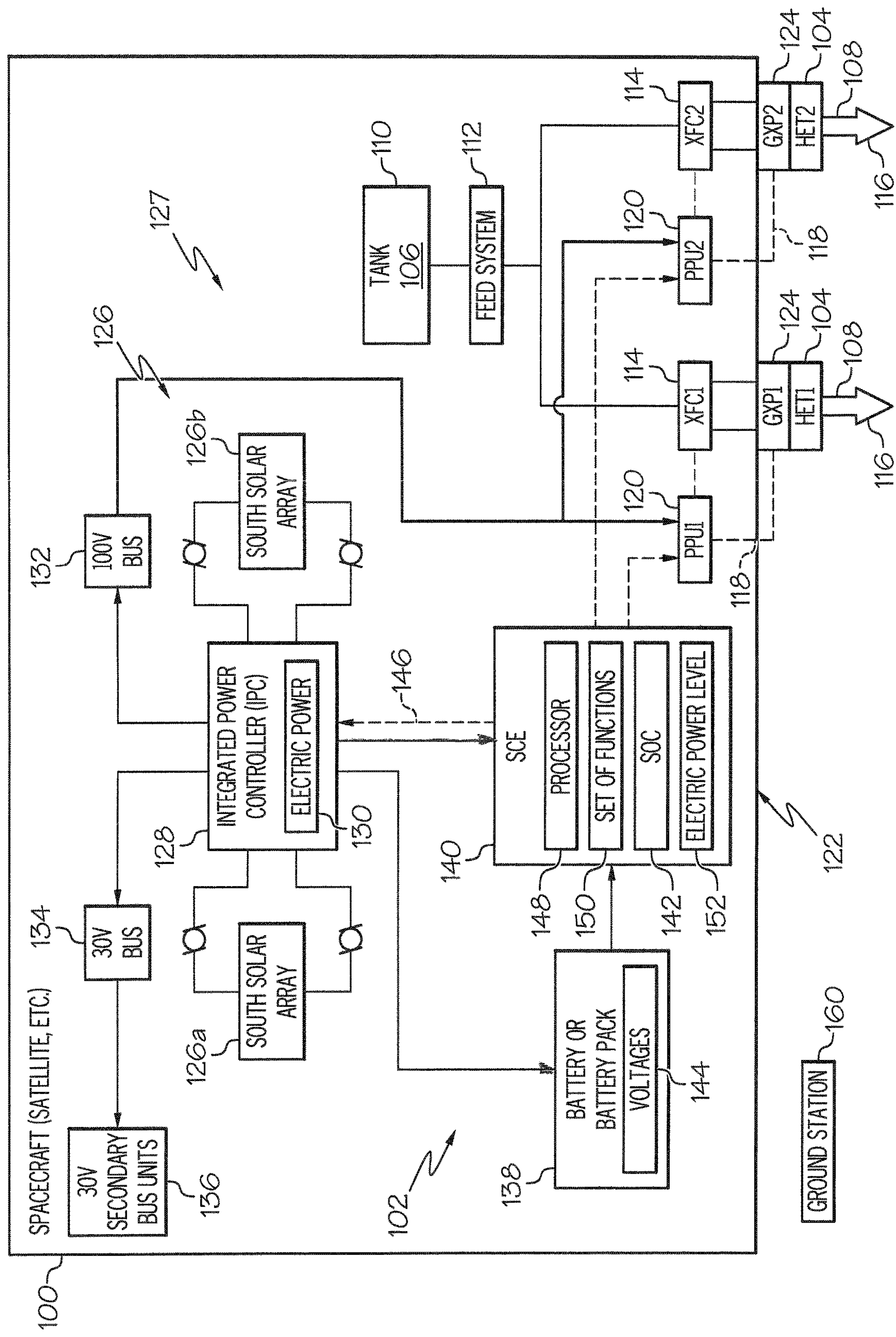
FIG. 1 is a block schematic diagram of an example of a spacecraft in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 3:
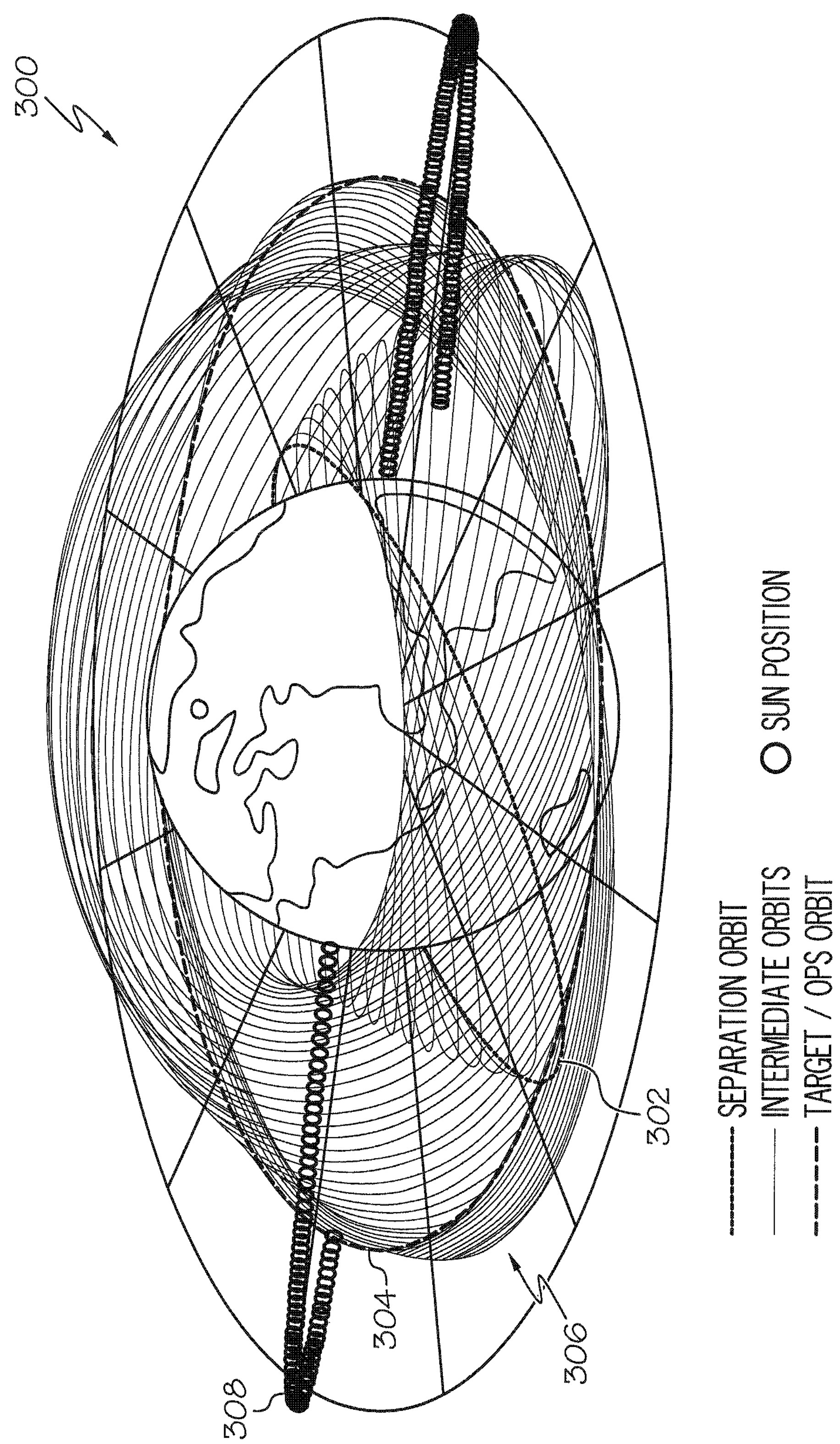
FIG. 3 is an illustration of an example of electric orbit raising of a spacecraft in accordance with an embodiment of the present disclosure.

FIG. 1 is a block schematic diagram of an example of a spacecraft 100 in accordance with an embodiment of the present disclosure. In an example, the spacecraft 100 is a satellite or other space vehicle or apparatus. The spacecraft 100 includes a system 102 for autonomously controlling electric power supplied to a thruster 104 of the spacecraft 100 during electric orbit raising. An example of electric orbit raising 300 is illustrated in FIG. 3 and is a procedure of transitioning the spacecraft 100 from a separation orbit 302 after separation from a launch vehicle 402 (FIG. 4) to a target orbit 304 where the spacecraft 100 will operate. Electric orbit raising 300 includes a series of transition orbits or intermediate orbits 306 during which thrusters 104 are fired to move the spacecraft 100 to the target orbit 304. A position 308 of the sun 410 (FIG. 4) during electric orbit raising 300 is also illustrated in the example of FIG. 3.

The spacecraft 100 includes a plurality of thrusters 104. In the example in FIG. 1, the spacecraft 100 includes two thrusters 104. In accordance with an example, the thrusters 104 are electric propulsion thrusters, such as Hall Effect thrusters (HET) or similar thrusters. The plurality of thrusters 104 are used for electric orbit raising 300 and station keeping when the spacecraft 100 reaches the target orbit 304. The thrusters 104 use a propellant 106 to generate thrust 108. The propellant 106 is stored in a tank 110. In accordance with an example, the propellant 106 is Xenon gas. The propellant 106 is fed to the thrusters 104 by a feed system 112. A propellant flow controller 114 such as a Xenon flow controller (XFC1 and XFC2), for example, is associated with each thruster 104 and operatively couples the feed system 112 to each thruster 104. The amount of thrust 108 generated by each thruster 104 during firing is controlled by an amount of electric power 118 supplied to each thruster 104 and the amount of propellant 106 used during firing of each thruster 104 is determined by the amount of electric power 118 supplied. The amount of electric power 118 and propellant 106 used will also be dependent upon the duration of firing each time the thruster 104 is fired. A power processing unit (PPU) 120 is also associated with each thruster 104 to control an amount of electric power 118 or electric power level 152 supplied to each thruster 104 during firing.

Each thruster 104 is mechanically coupled to an exterior 122 of the spacecraft 100 by a gimbaled platform mechanism 124 such as a Xenon gimbaled platform (GXP1 and GPX2) mechanism for example. The gimbaled platform mechanism 124 provides autonomous momentum dump capability by moving the thrust direction 116 to dump accumulated momentum due to center of gravity travel of the spacecraft 100 and thruster pointing.

The spacecraft 100 also includes one or more solar arrays 126 operatively attached to the spacecraft 100. The solar arrays 126 are configured to convert light energy to electric energy and provide electric power 130 to the components 127 of the spacecraft 100. In the example in FIG. 1, the spacecraft 100 includes a north solar array 126*a* and a south solar array 126*b*. The north solar array 126*a* and the south solar array 126*b* are mounted on opposite sides of the spacecraft 100. The north solar array 126*a* and the south solar array 126*b* are electrically coupled to an integrated power controller (IPC) 128. The IPC 128 receives electric power 130 from the solar arrays 126 and controls distribution of the electric power 130 to other components 127 of the spacecraft 100. In the example illustrated in FIG. 1, the IPC 128 provides the electric power 130 to the power processing units 120 to operate the thrusters 104 via a 100 volt bus 132. The IPC 128 also distributes electric power 130 to other components 127 of the spacecraft via a 30 volt bus 134 which is connected to secondary bus units 136.

Figure 5A:
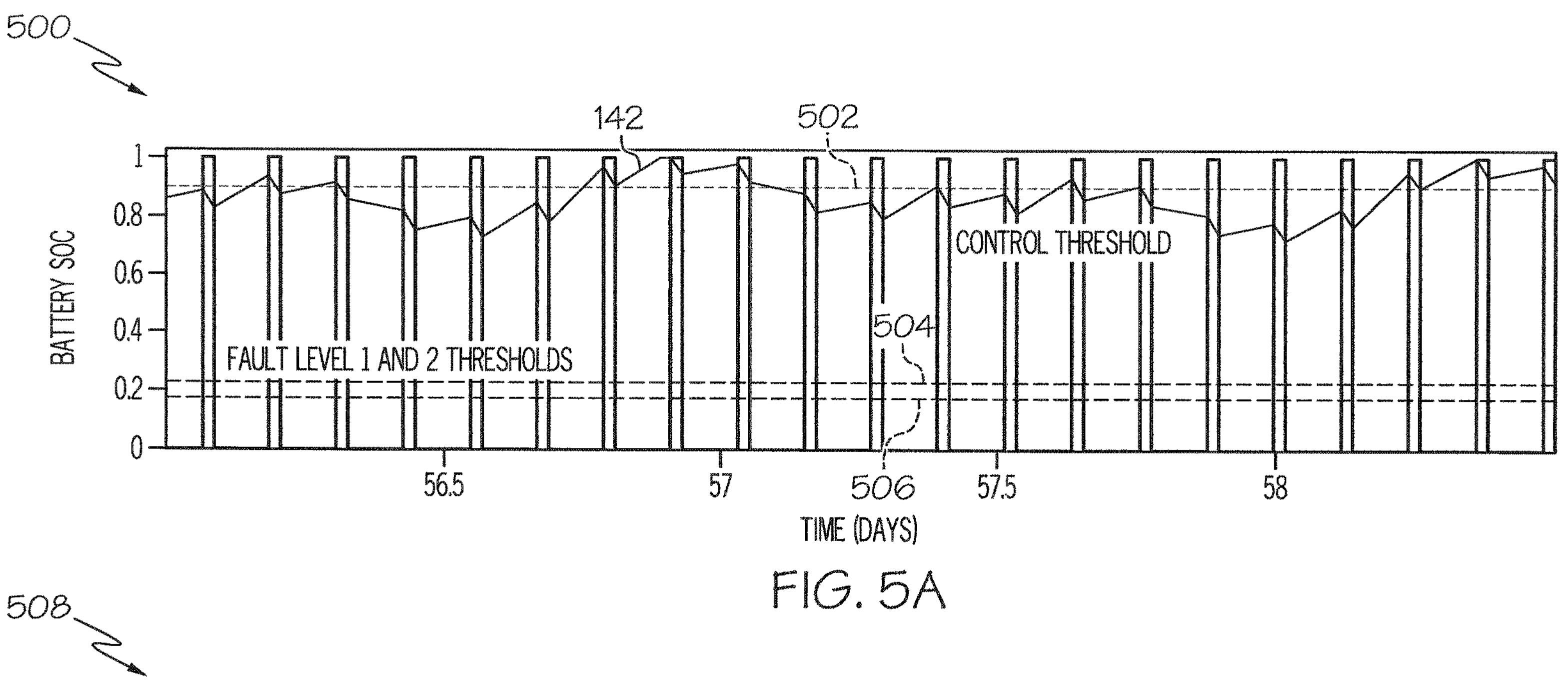
FIG. 5A is a graph illustrating an example of a state of charge (SOC) of a battery during electric orbit raising in accordance with an embodiment of the present disclosure.

The spacecraft 100 also includes a battery 138 to power the spacecraft 100. In one embodiment, the battery 138 is a battery pack. The spacecraft 100 further includes spacecraft control electronics (SCE) 140 powered by the battery 138. The battery 138 is charged by electric power 130 from the solar arrays 126 through the IPC 128. The IPC 128 controls charging of the battery 138 by the solar arrays 126. A state of charge (SOC) 142 of the battery 138 is monitored by the spacecraft control electronics 140. Voltages 144 associated with the battery are measured to determine the SOC 142 of the battery 138 at any time. Referring also to FIG. 5A, FIG. 5A is a graph 500 illustrating an example of a state of charge (SOC) 142 of a battery 138 during electric orbit raising 300 in accordance with an embodiment of the present disclosure. The horizontal axis is time measured in days and the vertical axis is battery SOC 142 measured in a percentage of charge of the battery 138. In accordance with an example, the spacecraft control electronics 140 transmit control signals 146 to the IPC 128 to control charging the battery 138 in response to at least the SOC 142 of the battery 138 to maintain a SOC 142 of the battery 138 proximate a preset threshold 502 (FIG. 5A) or within predetermined limits. In the example in FIG. 5A, the preset threshold 502 is about 90% of a full charge of the battery 138. In other examples or applications, the preset threshold 502 may be set at other preset threshold levels. Maintaining the SOC 142 of the battery 138 proximate the preset threshold 502 or within predetermined limits is also referred to as maintaining a balanced SOC 142 of the battery 308.

Figure 4:
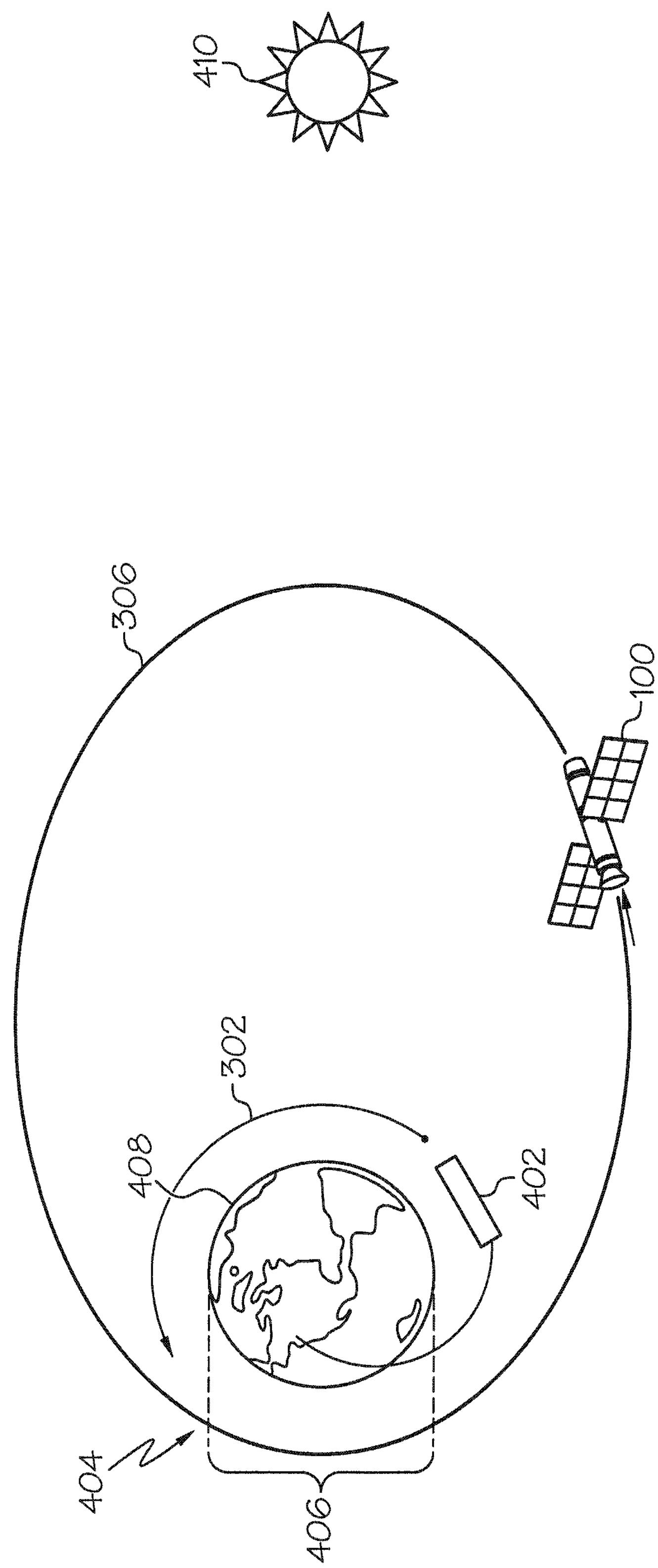
FIG. 4 is an illustration of an eclipse during electric orbit raising of a spacecraft in accordance with an embodiment of the present disclosure.

In accordance with an example, the spacecraft control electronics 140 include a processor 148. The spacecraft control electronics 140 are configured to perform a set of functions 150 as described in more detail with reference to FIGS. 2A and 2B. For example, the spacecraft control electronics 140 are configured to control operation of the thrusters 104. Referring also to FIG. 4, FIG. 4 is an illustration of an eclipse 406 during electric orbit raising 300 of a spacecraft 100 in accordance with an embodiment of the present disclosure. The spacecraft control electronics 140 are also configured to determine the SOC 142 of the battery 138 onboard the spacecraft 100 at an entry 404 (FIG. 4) into an eclipse 406 during each orbit 306 of a plurality of orbits 306 during the electric orbit raising 300 of the spacecraft 100. The plurality of orbits 306 are also referred to as intermediate orbits. An eclipse 406 occurs during each orbit 306 when the earth 408 is between the spacecraft 100 and the sun 410.

Figure 5B:
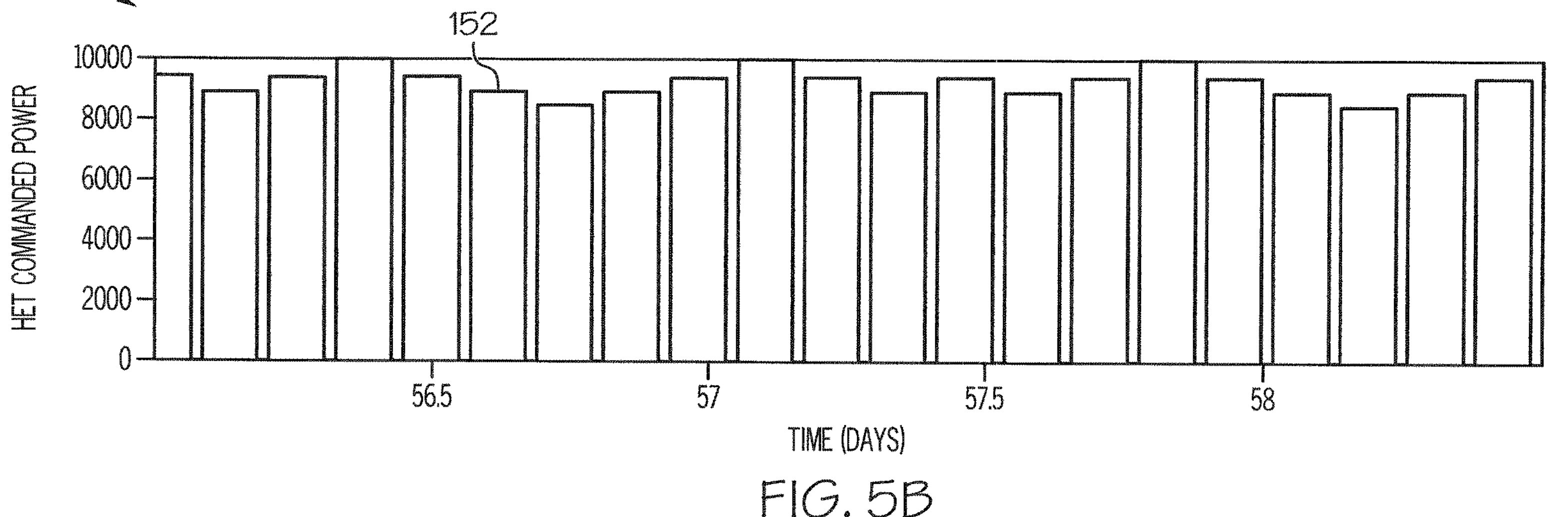
FIG. 5B is a graph illustrating an example of an electric power level supplied to a thruster during electric orbit raising in accordance with an embodiment of the present disclosure.

The space craft control electronics 140 are also configured to determine an electric power level 152 used to fire each thruster 104 during each orbit 306 beginning after the eclipse 406. The electric power level 152 is determined based on the SOC 142 of the battery 138. The electric power level 152 supplied to each thruster 104 is also determined based on a particular electric power level 152 that will provide a shortest electric orbit raising 300 duration and minimize propellant 106 usage during the electric orbit raising 300. Referring also to FIG. 5B, FIG. 5B is a graph 508 illustrating an example of electric power level 152 supplied by a power processing unit 120 to an associated thruster 104 during electric orbit raising 300 to maximize thruster power and minimize electric orbit raising 300 in accordance with an embodiment of the present disclosure. The horizontal axis is time measured in days and the vertical axis is thruster command power measured in watts.

In accordance with an example, the spacecraft control electronics 140 are additionally configured to balance the SOC 142 of the battery 138 for each orbit 306 by autonomously controlling the electric power level 152 supplied to each thruster 104 and autonomously controlling the timing during which each thruster 104 is fired during each orbit 306 of the electric orbit raising 300. In one example, the spacecraft control electronics 140 are further configured to fire each thruster 104 during sun light and shut off each thruster 104 during the eclipse 406 of each orbit 306 of the plurality of orbits 306 during electric orbit raising 300. As previously described, the electric power level 152 used to fire each thruster 104 is determined by determining an electric power level 152 supplied to each thruster 104 by the power processing unit 120 associated with each thruster 104. As described in more detail with reference to FIGS. 2A and 2B, the electric power level 152 supplied by the power processing unit 120 to the associated thruster 104 is set based on matching a particular SOC 142 of the battery 138 to a corresponding one of a plurality of predefined operating points 602 (FIG. 6) of the power processing unit 120 and the associated thruster 104. The electric power level 152 supplied by the power processing unit 120 to the associated thruster 104 is set in steps to match the particular SOC 142 of the battery 138 to the corresponding one of the plurality of predefined operating points 602 of the power processing unit 120 and the associated thruster 104.

Figure 2A:
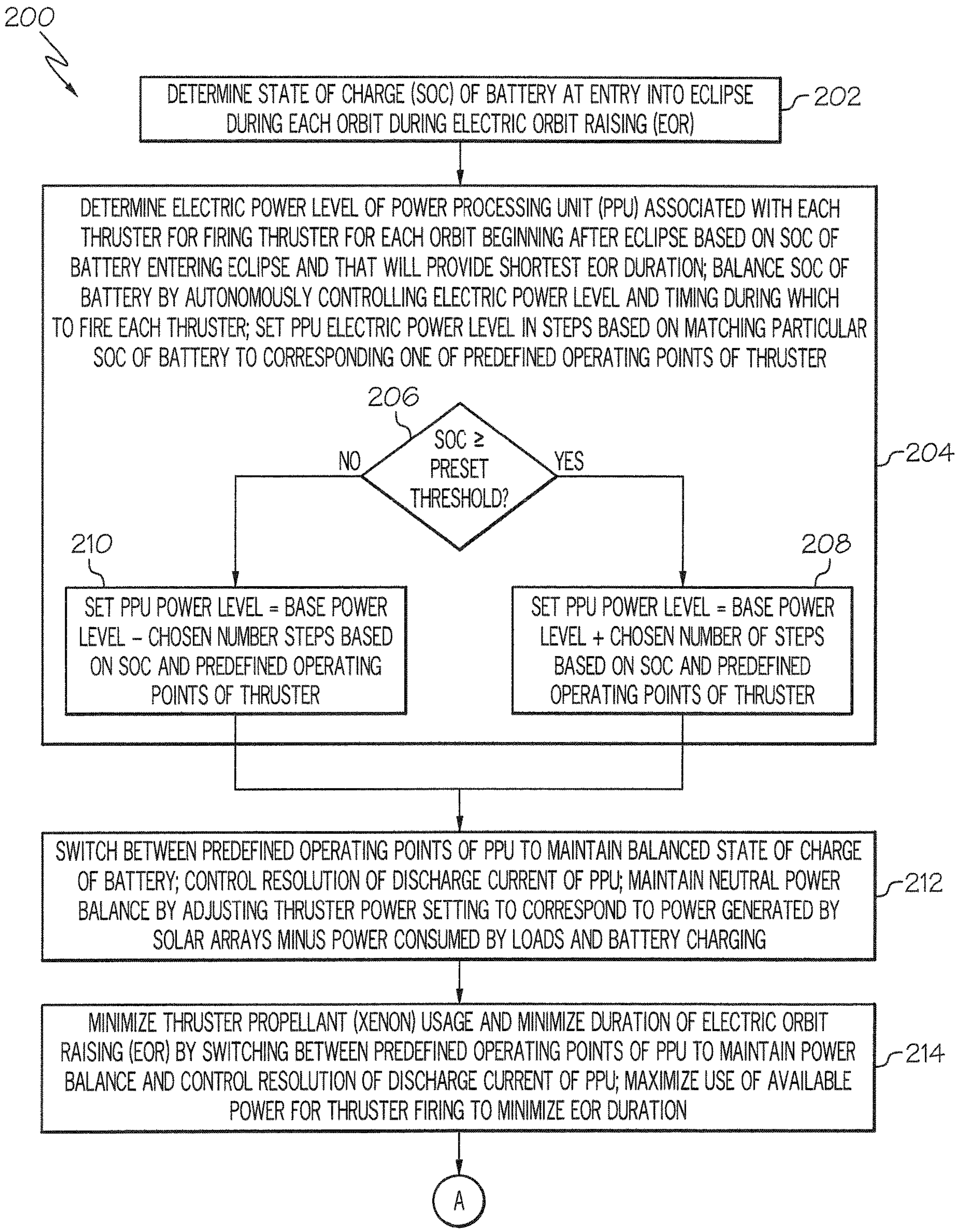
FIGS. 2A and 2B are a flow chart of an example of a method for autonomously controlling electric power supplied to a thruster during electric orbit raising of a spacecraft in accordance with an embodiment of the present disclosure.
Figure 2B:
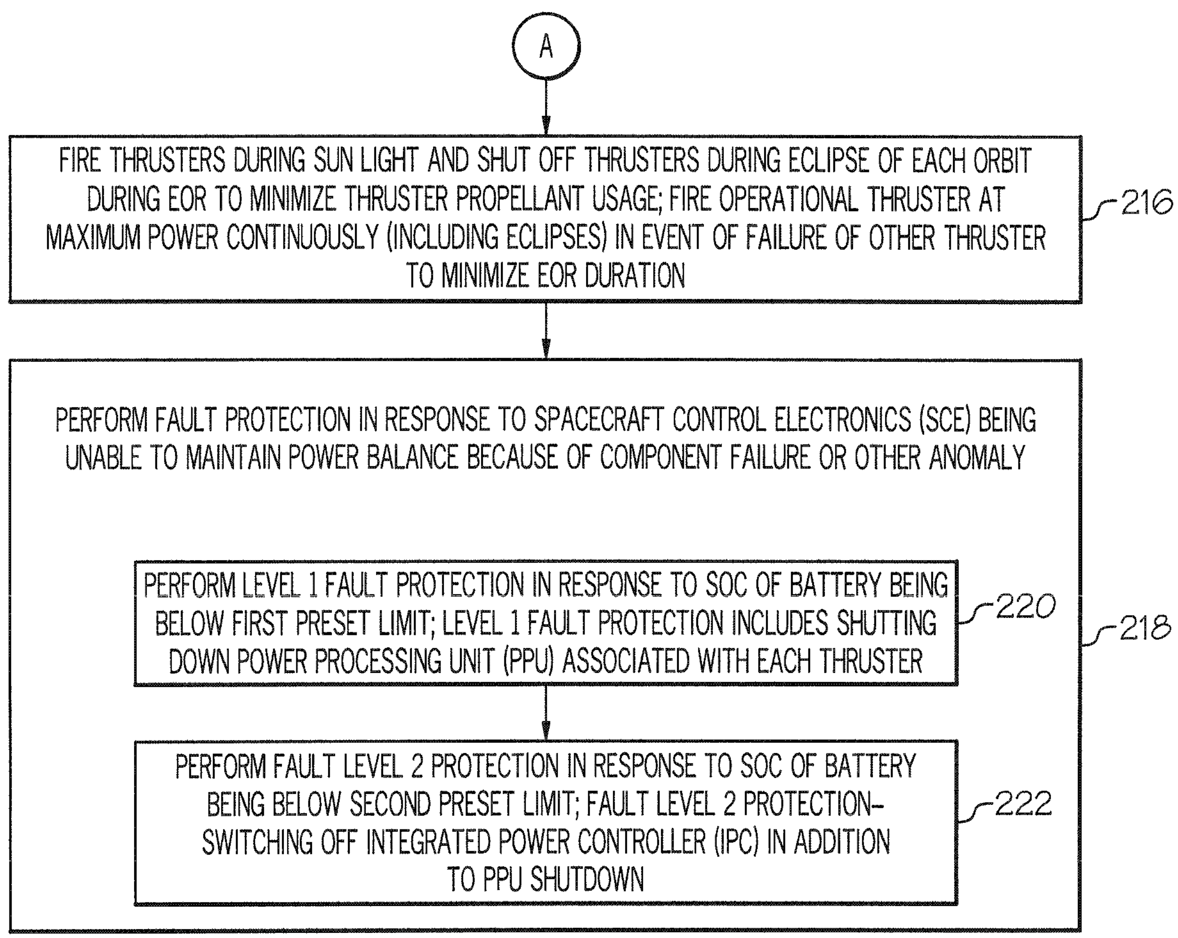

FIGS. 2A and 2B are a flow chart of an example of a method 200 for autonomously controlling electric power 118 supplied to a thruster 104 during electric orbit raising 300 (FIG. 3) of a spacecraft 100 (FIG. 1) in accordance with an embodiment of the present disclosure. In accordance with an example, the method 200 is embodied in and performed by the spacecraft control electronics 140. In block 202, a state of charge 142 of a battery 138 onboard the spacecraft 100 is determined at an entry 404 (FIG. 4) into an eclipse 406 during each orbit 306 of a plurality of orbits 306 during the electric orbit raising 300 of the spacecraft 100.

In block 204, an electric power level 152 is determined to use to fire each thruster 104 of a plurality of thrusters 104 during each orbit 306 beginning after the eclipse 406, based at least on the state of charge 142 of the battery 138, such that the determined electric power level 152 provides a shortest electric orbit raising 300 duration, and minimizes thruster propellant 106 usage during electric orbit raising 300. The state of charge 142 of the battery 138 is balanced for each orbit 306 by autonomously controlling the electric power level 152 and timing during which each thruster 104 is fired during each orbit 306 of the electric orbit raising 300. As previously described, the state of charge 142 of the battery 138 is balanced by maintaining the state of charge 142 of the battery 138 proximate the preset threshold 502 (FIG. 5A) or within predetermined limits. The electric power level 152 used to fire each thruster 104 is autonomously controlled onboard the spacecraft 100 without control from a ground station 160 (FIG. 1) or with minimal control from the ground station 160.

Determining the electric power level 152 used to fire each thruster 104 includes determining an electric power level 152 supplied to each thruster 104 by a power processing unit 120 associated with each thruster 104. The electric power level 152 supplied by the power processing unit 120 to the associated thruster 104 is set based on matching a particular state of charge 142 of the battery 138 to a corresponding one of a plurality of predefined operating points 602 (FIG. 6) of the associated thruster 104. Referring also to FIG. 6, FIG. 6 is a table 600 of an example of a plurality of predefined operating points 602 of a power processing unit 120 and associated thruster 104 in accordance with an embodiment of the present disclosure. Each of the plurality of predefined operating points 602 of the power processing unit 120 and associated thruster 104 are defined by a group of parameters 604 which are supplied by the power processing unit 120 to the associated thruster 104 to control firing of the thruster 104. Examples of the parameters 604 include but are not necessarily limited to a discharge power 604*a*, a discharge voltage 604*b*, a discharge current 604*c*, and a magnetic current 604*d* of the power processing unit 120 which is supplied to the associated thruster 104.

The electric power level 152 supplied by the power processing unit 120 to the associated thruster 104 is set in steps to match the particular state of charge 142 of the battery 138 to the corresponding one of the plurality of predefined operating points 602 (FIG. 6) of the power processing unit 120 and the associated thruster 104. In block 206, a determination is made whether the state of charge 142 of the battery 138 is greater than or equal to a preset threshold, for example, the preset threshold 502 in FIG. 5. If the state of charge 142 of the battery 138 is greater than or equal to the preset threshold 502 in block 206, the method 200 advances to block 208.

In block 208, the electric power level 152 supplied by the power processing unit 120 to the associate thruster 104 is set by adding a chosen number of power level steps to a base power level in response to the state of charge 142 of the battery 138 exceeding or being equal to a preset threshold 502. The chosen number of power level steps is determined by matching the state of charge 142 of the battery 138 to a corresponding one of the plurality of predefined operating points 602 (FIG. 6) of the power processing unit 120 and associated thruster 104. This process maximizes the amount of thrust 108 produced by each thruster 104 each orbit 306 during electric orbit raising 300 to minimize the duration of electric orbit raising 300 and to conserve propellant 106.

If the state of charge 142 of the battery 138 is less than the preset threshold 502 in block 206, the method 200 advances to block 210. In block 210, the electric power level 152 supplied by the power processing unit 120 to the associated thruster 104 is set by subtracting a chosen number of power level steps from a base power level in response to the state of charge 142 of the battery 138 being less than the preset threshold 502. The chosen number of power level steps is determined by matching the state of charge 142 of the battery 138 to a corresponding one of the plurality of predefined operating points 602 of the power processing unit 120 and the associated thruster 104.

In block 212, the processor 148 of the space craft control electronics 140 are configured to switch between the plurality of predefined operating points 602 of the power processing unit 120 and the associated thruster 104 to maintain a balanced state of charge 142 of the battery 138. The balanced state of charge 142 of the battery 138 is maintained by keeping the state of charge 142 of the battery 138 proximate the preset threshold 502. The plurality of predefined operating points 602 include a set of parameters 604 of the associated thruster 104 as previously described. The power processing unit 120 is also configured to provide fine control of a resolution of the discharge current 604*c* supplied by the power processing unit 120 to the associated thruster 104. Fine control includes adjusting the resolution of the discharge current 604*c* by the power processing unit 120 to provide more precise control of the electric power 118 supplied by power processing unit 120 to the associated thruster 104.

Also in block 212, a neutral power balance is maintained by adjusting thruster power settings to correspond to the electric power 130 generated by the solar arrays 126 minus electric power 130 consumed by loads, such as components 127, and battery charging. The neutral power balance is defined as a balance between the amount of electric power 118 used to fire each of the thrusters 104 during each orbit 306 and the electric power 130 generated by the solar arrays 126 reduced by the electric power 130 consumed by loads, such as components 127 consuming electric power 130, and also reduced by charging the battery 138 during each orbit 306.

In block 214, thruster propellant 106 usage is minimized and the electric orbit raising 300 duration is minimized by switching between the predefined operating points 602 (FIG. 6) of the power processing unit 120 and the associated thruster 104 to maintain the balanced state of charge 142 of the battery 138. Available electric power 118 used to fire the thrusters 104 is maximized by maintaining the balanced state of charge 142 of the battery 142. Maximizing the available electric power 118 used to fire the thruster 104 minimizes the electric orbit raising 300 duration and preserves propellant 106 for station keeping.

In block 216, each thruster 104 is fired during sun light and shut off during the eclipse 406 (FIG. 4) of each orbit 306 of the plurality of orbits 306 during electric orbit raising 300 to minimize thruster propellant 106 usage and to minimize the electric orbit raising 300 duration. However, in the event of a failure of one of the thrusters 104, as per one example, the operational thruster will be fired at maximum power continuously, including eclipses 406, to minimize the electric orbit raising 300 duration.

In block 218, fault protection is performed in response to being unable to maintain a balanced state of charge 142 of the battery 138. Fault protection prevents the battery 138 from discharging substantially completely. In accordance with an embodiment, fault protection is a flight software (FSW) algorithm that is monitoring a spacecraft parameter, such a state of charge 142 of the battery 138, and will trigger a response if the parameter exceeds or gets below a predetermined threshold(s). The fault response is a sequence of commands that are issued by the FSW to the spacecraft components, such as the power processing units 120 and the integrated power controller 128, to prevent complete shutdown of the spacecraft components and to protect the spacecraft 100. There can be several levels or tiers for a fault response. For example, the level 1 (or tier 1) fault protection will be triggered first, then if level 1 fault protection fails to correct the failure condition, level 2 (or tier 2) fault protection is triggered that usually have a more drastic response. In accordance with an embodiment, the fault protection is embodied in and performed by the spacecraft electronics 140.

In accordance with an example, blocks 220 and 222 define two levels of fault protection. In block 220, a level 1 fault protection is performed in response to the state of charge 142 of the battery 138 being below a first preset fault threshold 504 (FIG. 5A). The level 1 fault protection includes shutting down the power processing unit 120 associated with each thruster 104. In the example of FIG. 5A, the first preset fault threshold 504 is slightly more than a 20% charge of the battery 138 or about 21% of a full or 100% charge of the battery 138.

In block 222, a level 2 fault protection is performed in response to the state of charge 142 of the battery 138 falling below a second preset fault threshold 506 (FIG. 5A) that is lower than the first preset fault threshold 504. The level 2 fault protection includes switching the integrated power controller (IPC) 128 (FIG. 1) off in addition to shutting down the power processing unit 120 associated with each thruster 104. The second preset fault threshold 506 is slightly less than a 20% charge of the battery 138 or about 19% of a full or 100% charge of the battery 138.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for autonomously controlling electric power supplied to a thruster of a spacecraft during electric orbit raising, comprising:

determining, by a processor, a state of charge of a battery onboard the spacecraft at an entry into an eclipse during each orbit of a plurality of orbits during the electric orbit raising of the spacecraft; and determining, by the processor, an electric power level used to fire each thruster of a plurality of thrusters during each orbit beginning after the eclipse, based at least on the state of charge of the battery, and that will provide a shortest electric orbit raising duration and minimize thruster propellant usage during electric orbit raising.

2. The method of claim 1, further comprising balancing the state of charge of the battery for each orbit by autonomously controlling the electric power level and timing during which each thruster is fired during each orbit of the electric orbit raising, wherein balancing the state of charge of the battery comprises maintaining the state of charge of the battery proximate a preset threshold or within predetermined limits.

3. The method of claim 1, further comprising firing each thruster during sun light and shutting off each thruster during the eclipse of each orbit of the plurality of orbits during electric orbit raising.

4. The method of claim 1, wherein the electric power level used to fire each thruster is autonomously controlled onboard the spacecraft without control from a ground station or with minimal control from the ground station.

5. The method of claim 1, wherein determining the electric power level used to fire each thruster comprises determining an electric power level supplied to each thruster by a power processing unit associated with each thruster.

6. The method of claim 5, wherein the electric power level supplied by the power processing unit to the associated thruster is set based on matching a particular state of charge of the battery to a corresponding one of a plurality of predefined operating points of the associated thruster.

7. The method of claim 6, wherein the electric power level supplied by the power processing unit to the associated thruster is set in steps to match the particular state of charge of the battery to the corresponding one of the plurality of predefined operating points of the associated thruster.

8. The method of claim 7, further comprising setting the electric power level supplied by the power processing unit by adding a chosen number of power level steps to a base power level in response to the state of charge of the battery exceeding or being equal to a preset threshold, the chosen number of power level steps being determined by matching the state of charge of the battery to a corresponding predefined operating point of the plurality of predefined operating points of the associated thruster.

9. The method of claim 7, further comprising setting the electric power level supplied by the power processing unit by subtracting a chosen number of power level steps from a base power level in response to the state of charge of the battery being less than a preset threshold, the chosen number of power level steps being determined by matching the state of charge of the battery to a corresponding predefined operating point of the plurality of predefined operating points of the associated thruster.

10. The method of claim 5, further comprising switching between a plurality of predefined operating points of the power processing unit associated with each thruster to maintain a balanced state of charge of the battery, the plurality of predefined operating points comprising a set of parameters of the associated thruster.

11. The method of claim 10, wherein each of the plurality of predefined operating points of the power processing unit are defined by a group of parameters comprising a discharge current, a discharge voltage and a magnetic current of the power processing unit.

12. The method of claim 11, further comprising minimizing thruster propellant usage and minimizing electric orbit raising duration by switching between the predefined operating points of the power processing unit to maintain the balanced state of charge of the battery.

13. The method of claim 5, further comprising performing fault protection in response to being unable to maintain a balanced state of charge of the battery.

14. The method of claim 13, wherein performing the fault protection comprises performing a level 1 fault protection in response to the state of charge of the battery being below a first preset fault threshold, the level 1 fault protection comprising shutting down the power processing unit associated with each thruster.

15. The method of claim 14, wherein performing the fault protection comprises performing a level 2 fault protection in response to the state of charge of the battery being below a second preset fault threshold lower than the first preset fault threshold, the level 2 fault protection comprising switching an integrated power controller (IPC) off in addition to shutting down the power processing unit associated with each thruster.

16. A system for autonomously controlling electric power supplied to a thruster of a spacecraft during electric orbit raising, comprising:

a battery to power the spacecraft;

a plurality of thrusters used for electric orbit raising of the spacecraft and station keeping of the spacecraft; and spacecraft control electronics powered by the battery, the spacecraft control electronics being configured to control operation of the thrusters, and the spacecraft control electronics being further configured to:

determine a state of charge of the battery onboard the spacecraft at an entry into an eclipse during each orbit of a plurality of orbits during the electric orbit raising of the spacecraft; and determine an electric power level used to fire each thruster of the plurality of thrusters during each orbit beginning after the eclipse, based on the state of charge of the battery, and that will provide a shortest electric orbit raising duration and minimize thruster propellant usage during the electric orbit raising.

17. The system of claim 16, wherein the spacecraft control electronics are further configured to balance the state of charge of the battery for each orbit by autonomously controlling the electric power level and timing during which each thruster is fired during each orbit of the electric orbit raising, wherein balancing the state of charge of the battery comprises maintaining the state of charge of the battery proximate a preset threshold or within predetermined limits.

18. The system of claim 16, wherein the spacecraft control electronics are further configured to fire each thruster during sun light and to shut off each thruster during the eclipse of each orbit of the plurality of orbits during electric orbit raising.

19. The system of claim 16, wherein the electric power level used to fire each thruster is determined by determining an electric power level supplied to each thruster by a power processing unit associated with each thruster, and wherein the electric power level supplied by the power processing unit to the associated thruster is set based on matching a particular state of charge of the battery to a corresponding one of a plurality of predefined operating points of the associated thruster.

20. The system of claim 19, wherein the electric power level supplied by the power processing unit to the associated thruster is set in steps to match the particular state of charge of the battery to the corresponding one of the plurality of predefined operating points of the associated thruster.

* * * * *